United States Patent [19]
Izumi

[11] 3,858,406
[45] Jan. 7, 1975

[54] REFRIGERANT EVAPORATOR FOR AIR CONDITIONER

[75] Inventor: Masao Izumi, Tokyo, Japan

[73] Assignee: Nissan Motor Company, Limited, Yokohama City, Japan

[22] Filed: Sept. 4, 1973

[21] Appl. No.: 394,089

[30] Foreign Application Priority Data
Sept. 6, 1972 Japan.............................. 47-89324
Sept. 6, 1972 Japan............................ 47-104023

[52] U.S. Cl...................... 62/210, 62/217, 62/225, 62/525
[51] Int. Cl........................................... F25b 41/04
[58] Field of Search ............ 62/204, 210, 212, 217, 62/222–225, 504, 525

[56] References Cited
UNITED STATES PATENTS
| | | | |
|---|---|---|---|
| 2,155,516 | 4/1939 | Tull..................................... | 62/217 |
| 2,642,724 | 6/1953 | Carter................................. | 62/225 |
| 3,242,687 | 3/1966 | Baker.................................. | 62/223 |
| 3,785,554 | 1/1974 | Proctor............................... | 62/217 |

Primary Examiner—Meyer Perlin
Attorney, Agent, or Firm—Frank J. Jordan

[57] ABSTRACT

A refrigerant evaporator having a fin and tube assembly integral with an expansion valve and a back pressure valve.

6 Claims, 8 Drawing Figures

REFRIGERANT EVAPORATOR FOR AIR CONDITIONER

The present invention relates to an air conditioner, and more particularly to refrigerant evaporator assembly for an air conditioner which can be easily manufactured and installed.

An air conditioner for an automobile usually includes a compressor, condenser, receiver-drier, expansion valve, evaporator and back pressure valve connected in a refrigerant flow relationship. It has been well recognized in the art that it is difficult to find suitable locations for these basic units because of space limitations within an engine compartment. Another difficulty resides in connecting these basic units scattered throughout the engine compartment together because connecting pipes to couple them must be free of kinks, dents and heat from the engine. Moreover, joints between the pipes and units must be sealed to provide a fluid and gas tight system. Thus, well trained mechanics and special tools are needed to install and service a conventional automobile air conditioner. With these difficulties in mind, it is here in proposed to integrate an evaporator with an expansion valve and a back pressure valve in order to solve the difficulty of connecting a separately located evaporator, expansion valve and back pressure valve.

Accordingly it is an object of the present invention to provide a refrigerant evaporator which is integral with an expansion valve and a back pressure valve.

Another object of the present invention is to provide a refrigerant evaporator which is easy to assemble.

Still another object of the present invention is to provide a refrigerant evaporator which can be manufactured at a high production rate and with close tolerance on a mass production basis.

For a better understanding of the invention, reference will now be made to the accompanying drawings wherein two preferred embodiments are illustrated.

Figure 1:
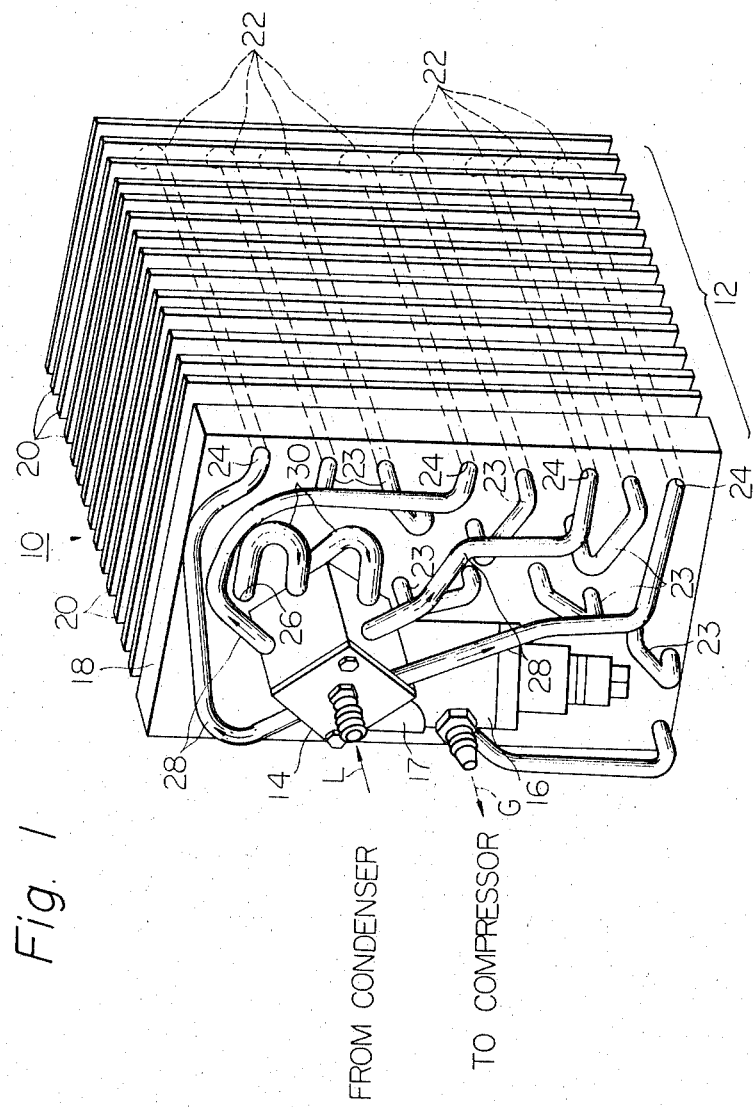
FIG. 1 is a perspective view of a first preferred form of an evaporator according to the present invention.
Figure 2:
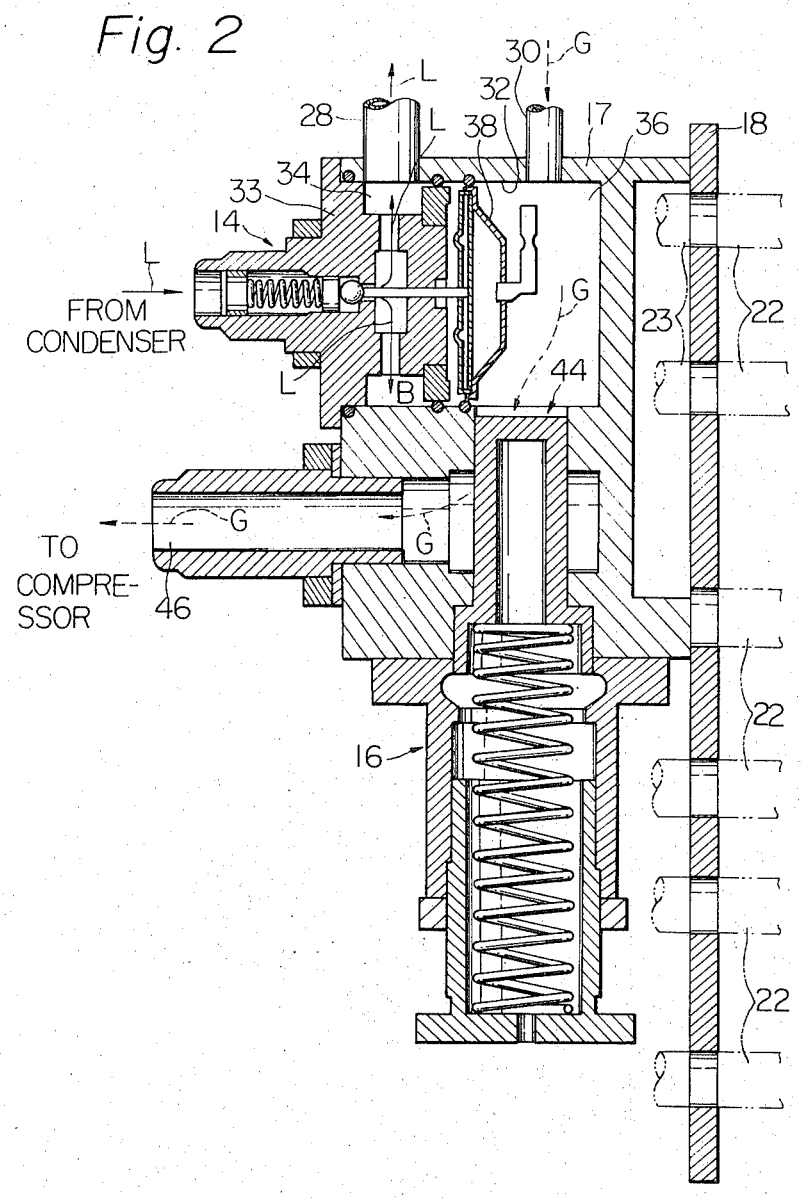
FIG. 2 is a fragmentary sectional view of the evaporator of FIG. 1.

Referring now to the drawings and particularly to FIGS. 1 and 2 thereof, there is illustrated a first preferred embodiment of an evaporator 10 according to the present invention. The evaporator 10 includes a fin and tube assembly 12, an expansion valve 14, a defroster 16, a header 17, and means connecting these elements together.

The fin and tube assembly 12 has an end wall 18, a series of spaced fin plates 20, and a plurality of tubes 22 extending through the fin plates 20 to the end wall 18. The tubes 22 are connected by connecting tubes 23 to form several refrigerant coils (no numerals). Each coil has an inlet and an outlet end 24 and 26 respectively at the end wall 18, as shown. The inlet and outlet ends 24 and 26 are connected, respectively, by distributing tubes 28 and collecting tubes 30 to the header 17. The header 17 is integrally secured to the end wall 18. The header 17 has formed therein a cavity 32 (see FIG. 2) for receiving the expansion valve 14, as shown. The cavity 32 is divided by a valve body 33 of the expansion valve 14 into a distributing chamber 34 and a collecting chamber 36. The distributing chamber 34 communicates with the inlet ends 24 via the distributing tubes 28, and the collecting chamber 36 with the outlet ends 26 via the collecting tubes 30.

Within the collecting chamber 36 and incorporated into the expansion valve 14 is a thermostat 38, which is operatively connected to the expansion valve 14 so that it controls the operation of the expansion valve 14 according to the temperature of the refrigerant in the collecting chamber 36. As the temperature rises, the expansion valve 14 increases the flow of refrigerant into the fin and tube assembly 12 via the collecting chamber 36 and the inlet ends 24 of the refrigerant coil.

The defroster 16 is in the form of a pressure velief valve 44 and is attached to the header 17 such that the pressure relief valve 44 is exposed to refrigerant in the collecting chamber 36 to regulate the pressure of the refrigerant in the collecting chamber 36 by increasing, if the pressure rises, the flow of refrigerant from the collecting chamber 36 to a compressor (not shown) via an outlet nozzle 46.

The operation of the embodiment of FIGS. 1 and 2 is described below.

Liquid refrigerant discharged from a compressor (not shown) flows into the expansion valve 14 where it is metered and expanded (its pressure is reduced), and then flows into the inlet ends 25 of the refrigerant coils of the fin and tube assembly 12 (see solid arrows L in FIGS. 1 and 2). The refrigerant vaporizes and cools in the fin and tube assembly 12 where it absorbs heat from air flowing between the fin plates 20. The heated refrigerant gas then flows out of the outlet ends 26 into the collecting chamber 36 where its pressure is modulated, and then flows from the outlet nozzle 46 of the back pressure valve 16 into the compressor (see phantom arrows G in FIGS. 1 and 2).

It will be appreciated that employing an evaporator 10 as described above in an air conditioner will alleviate the aforementioned difficulty of connecting the units of the air conditioner together.

Although in this preferred embodiment, the header 17 is separate from the end wall 18, it may be made integral with the end wall 18, if desired.

It has been noted that the connecting tubes 23 have to be welded to the tubes 22 to provide the fin and tube assembly 12, and that the distributing tubes 28 and the collecting tubes 30 have to be welded to the inlet ends 24 and the header 17 and to the outlet ends 26 and the header 17 respectively to provide the evaporator 10.

Referring next to FIGS. 3–6, there is shown a second preferred embodiment of the present invention. The second embodiment is identical to the first embodiment in function, but different in structure.

The main structural difference between the first embodiment (see FIGS. 1 and 2) and the second embodiment (see FIGS. 3 – 6) is that the latter does not employ the connecting tubes 23 to provide a fin and tube assembly 12 or the collecting and distributing tubes 26 and 28 to provide a final assembly.

Figure 3:
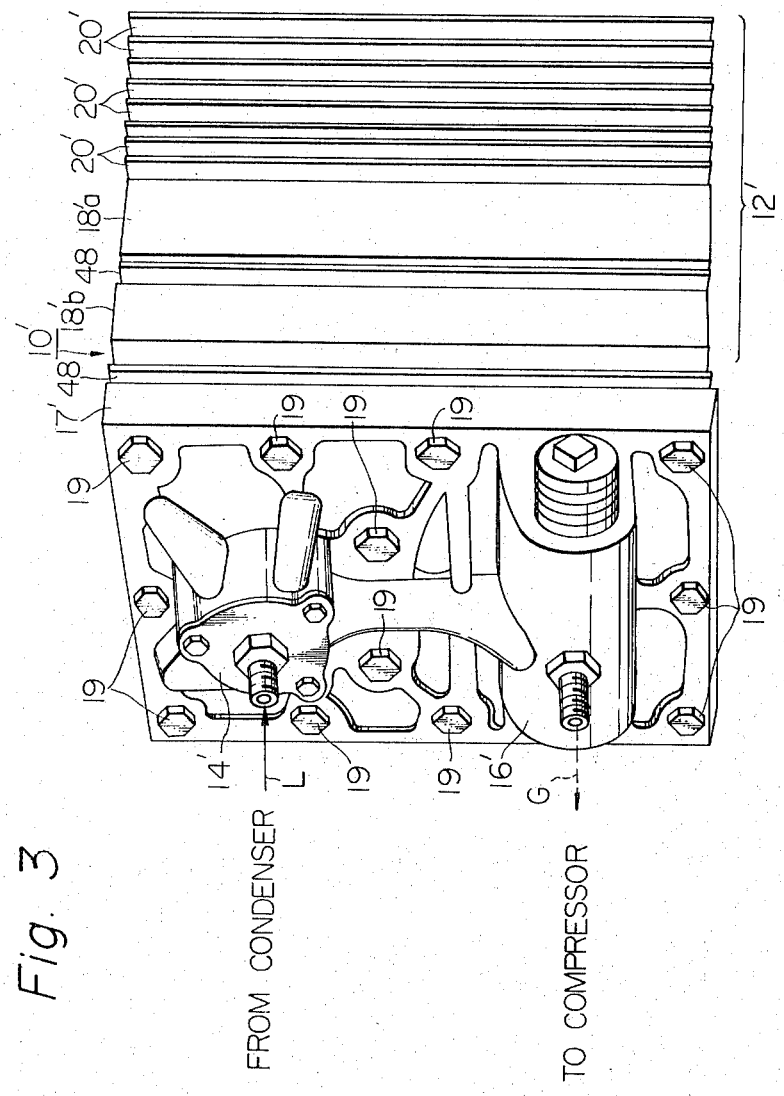
FIG. 3 is a perspective view of a second preferred form of an evaporator according to the present invention.
Figure 4A:
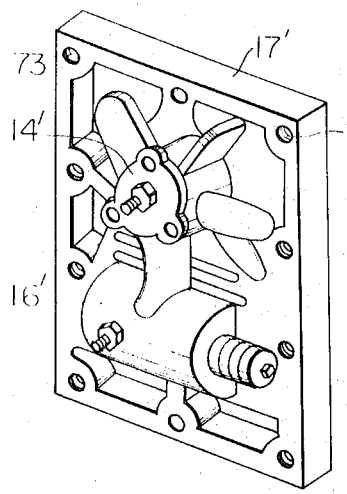
FIGS. 4a, 4b, 5a, 5b and 6 are exploded views of the evaporator of FIG. 3.

Another structural feature of the second embodiment of the present invention resides in employing a plurality of U-shaped tubes 22' (see FIG. 6) to provide a fin and tube assembly 12' (see FIG. 3).

A refrigerant evaporator 10' illustrated in FIG. 3 includes a first plate 18'a and a second plate 18'b, which perform the same function as the end wall 18 and the connecting tubes 23 of the first embodiment. The refrigerant evaporator 10' further includes fin plates 20' and the U-shaped tubes 22', and a header or third plate 17'. The third plate 17' performs the same function as the header 17 and the distributing and collecting tubes 28 and 30 of the first embodiment. The first, second and third plates 18'a, 18'b and 17' are held together by a plurality of bolts 19, by way of example. Interposed between two adjacent plates are packings 48 to prevent leakage of refrigerant.

Referring particularly to FIGS. 4a, 4b, 5a, 5b and 6, there are shown disassembled view of the first, second and third plates 18'a, 18'b and 17'.

The first plate 18'a has formed therethrough four horizontal rows of three openings 50 each, and four inlet holes 52 and four outlet holes 54. Each inlet and outlet hole 52 and 54 respectively is located adjacent to a horizontal row of openings 50. Also provided in the first plate 18'a is a plurality of threaded holes 55 to receive the corresponding bolts 19. Each U-shaped tube 22' is connected to its horizontally adjacent tube or tubes to form an eight-pass refrigerant flow arrangement for each horizontal row. In the uppermost horizontal row, for example, one end of the rightmost tube 22' projects into the uppermost inlet hole 52 and is secured thereto by welding, and the other end projects into the uppermost and rightmost opening 50 and is secured thereto by welding. The next adjacent two U-shaped tubes 22' in the uppermost horizontal row project at their respective ends into the next adjacent two openings 50 in the uppermost horizontal row and are welded thereto. One end of the leftmost U-shaped tube 22' in the uppermost horizontal row projects into the leftmost opening 50 in the uppermost horizontal row and the other end projects into the uppermost outlet hole 54, and the ends are welded into place.

Thus, in each horizontal row, a flow path is established from the respective inlet hole 52 to the respective outlet hole 54 through the four tubes 22' in an eight-pass series arrangement.

Figure 5A:
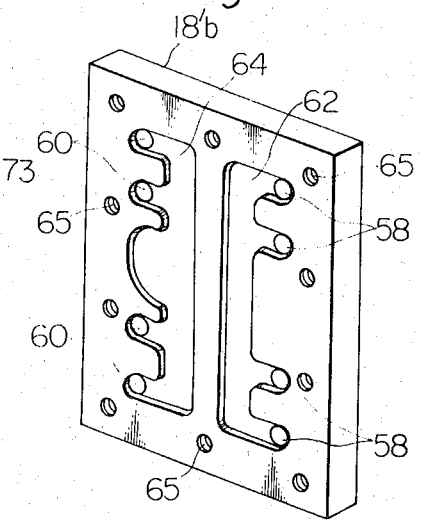
Figure 4B:
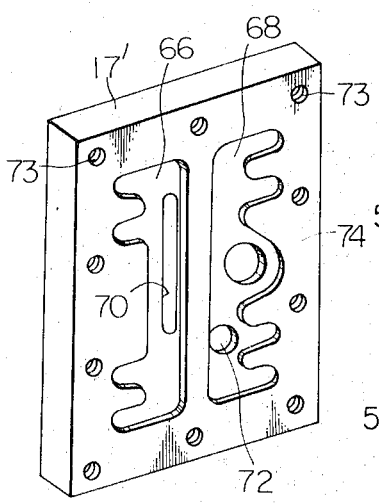
Figure 5B:
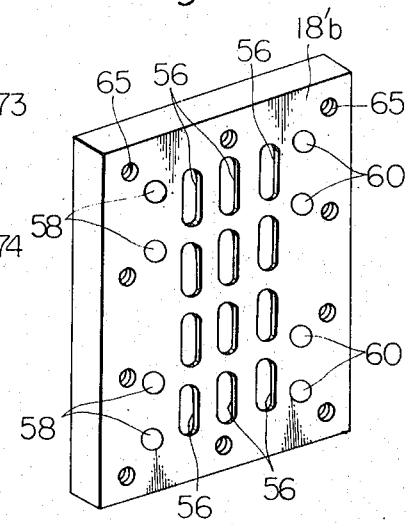
Figure 6:
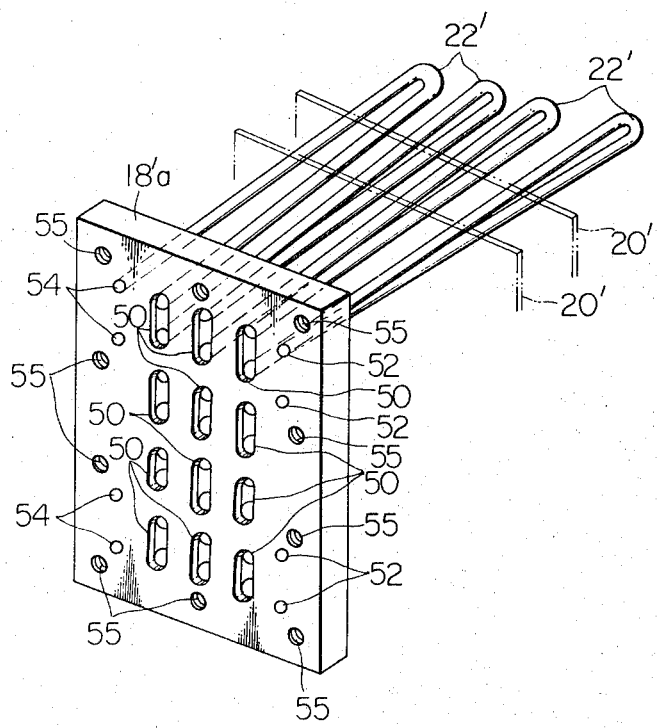

The second plate 18'b has formed in the surface facing the first plate 18'a four horizontal rows of three grooves 56 each (see FIG. 5b), which align with the openings 50 of the first plate 18'a. The second plate 18'b has inlet holes 58 which align with the inlet holes 52 of the first plate 18'a, and outlet holes 60 which align with the outlet holes 54 of the first plate 18'b. The inlet holes 58 open into a first recess 62 formed in the opposite surface of the second plate 18'b, while the outlet holes 60 open into a second recess 64 formed in the same surface as but separate from the recess 62, as shown in FIG. 5a. Designated by reference numerals 65 are threaded holes to receive the bolts 19.

The third plate 17' has formed in the surface facing the second plate 18'b a distributing recess 66 and a collecting recess 68, the distributing recess 66 aligning with the recess 62 and the collecting recess with the recess 64 (see FIGS. 4b and 5a) of the plate 18'b. Provided through the distributing recess 66 and the plate 17' is an aperture 70 to receive the outlet end of an expansion valve 14'. Provided through the collecting recess 68 and the plate 17' are apertures 72 and 74 to receive the inlet end of a defroster 16' and a temperature sensing bulb (not shown) of the expansion valve 14'.

Designated by reference numerals 73 are threaded holes to receive the bolts 19.

The first, second and third plates 18'a, 18'b and 17' are joined face to face by the bolts 19 after interposing between adjacent plates the packings 48 as shown in FIG. 3. The first and second plates 18'a and 18'b should be joined so that the grooves 56, the inlet holes 58 and the outlet holes 60 align with the openings 50, the inlet holes 52 and the outlet holes 54, respectively. The grooves 56 and the openings 50, in conjunction with the packing 48 interposed between the first and the second plate 18'a and 18'b, form a plurality of passageways connecting the ends of U-shaped tubes 22' projecting into each opening 50. The third and second plates 17' and 18'b should be joined so that the distributing recess 66 and the collecting recess 68 align with the recess 62 and the recess 64, respectively, thus providing a distributing chamber and a collecting chamber, respectively.

The expansion valve 14' and the back pressure valve 16' are integrally attached to the third plate 17' (see FIG. 4a) so that the outlet end of the expansion valve 14' projects into the aperture 70, the inlet end of the back pressure valve 16' into the aperture 72 and the temperature sensing bulb (not shown) of the expansion valve 14' into the aperture 74, in a fluid and gas tight manner.

It will be understood from the description of the evaporator 10' that the first and second plates 18'a and 18'b have replaced the connecting tubes 23, distributing tubes 28 and collecting tubes 30 employed in the evaporator of 10 of FIG. 1. It will also be understood that the third plate 17' may be made flat by forming the distributing and collecting recesses in the same surface thereof. From the structural features described above, it will be appreciated that the thickness of the third plate 17' is reduced remarkably in the evaporator 10'.

It is also to be noted that welding operations are remarkably reduced in the manufacture of the evaporator 10' as compared to the evaporator 10 because the operation of welding the distributing and collecting tubes 28 and 30 between the header 17 and the fin and tube assembly 12 is unnecessary. Thus a final product with close tolerance will be provided in accordance with the second embodiment of the present invention.

It will be readily noted that the first, second, and third plates 18'a, 18'b and 17' can be made by forgoing or casting metal. Thus, the evaporator 10' is suitable for mass production. Moreover, since the plates can be easily assembled into a final product, manufacturing productivity is excellent in mass production.

What is claimed is:

1. A refrigerant evaporator for an air conditioner comprising: a fin and tube assembly having an end wall and a coil with inlet and outlet ends projecting through said end wall; said coil being formed from a plurality of U-shaped tubes interconnected by said end wall in a series arrangement, an expansion valve; a back pressure valve; and means connecting said expansion valve, said back pressure valve and said coil of said fin and tube assembly in a refrigerant flow relationship, said means being integral with said end wall, said expansion valve and said back pressure valve.

2. A refrigerant evaporator as claimed in claim 1, wherein said end wall has conduits connecting said U-shaped tubes in series with each other.

3. A refrigerant evaporator as claimed in claim 2, wherein said end wall includes first and second plates joined face to face, said first plate defining openings therethrough, said second plate having grooves in alignment with said openings to form said conduits.

4. A refrigerant evaporator as claimed in claim 3, wherein said second plate includes a first recess communicating with the inlet end of said coil and a second recess communicating with the outlet end of said coil.

5. A refrigerant evaporator as claimed in claim 4, wherein said end wall includes a third plate joined to said second plate face to face, said third plate having a distributing recess in alignment with said first recess to define in conjunction therewith a distributing chamber and a collecting recess in alignment with said second recess to define in conjunction therewith a collecting chamber.

6. A refrigerant evaporator as claimed in claim 5, wherein said expansion valve has an outlet end which projects into said distributing chamber, and wherein said defroster has an inlet end which projects into said collecting chamber.

* * * * *